UNITED STATES PATENT OFFICE.

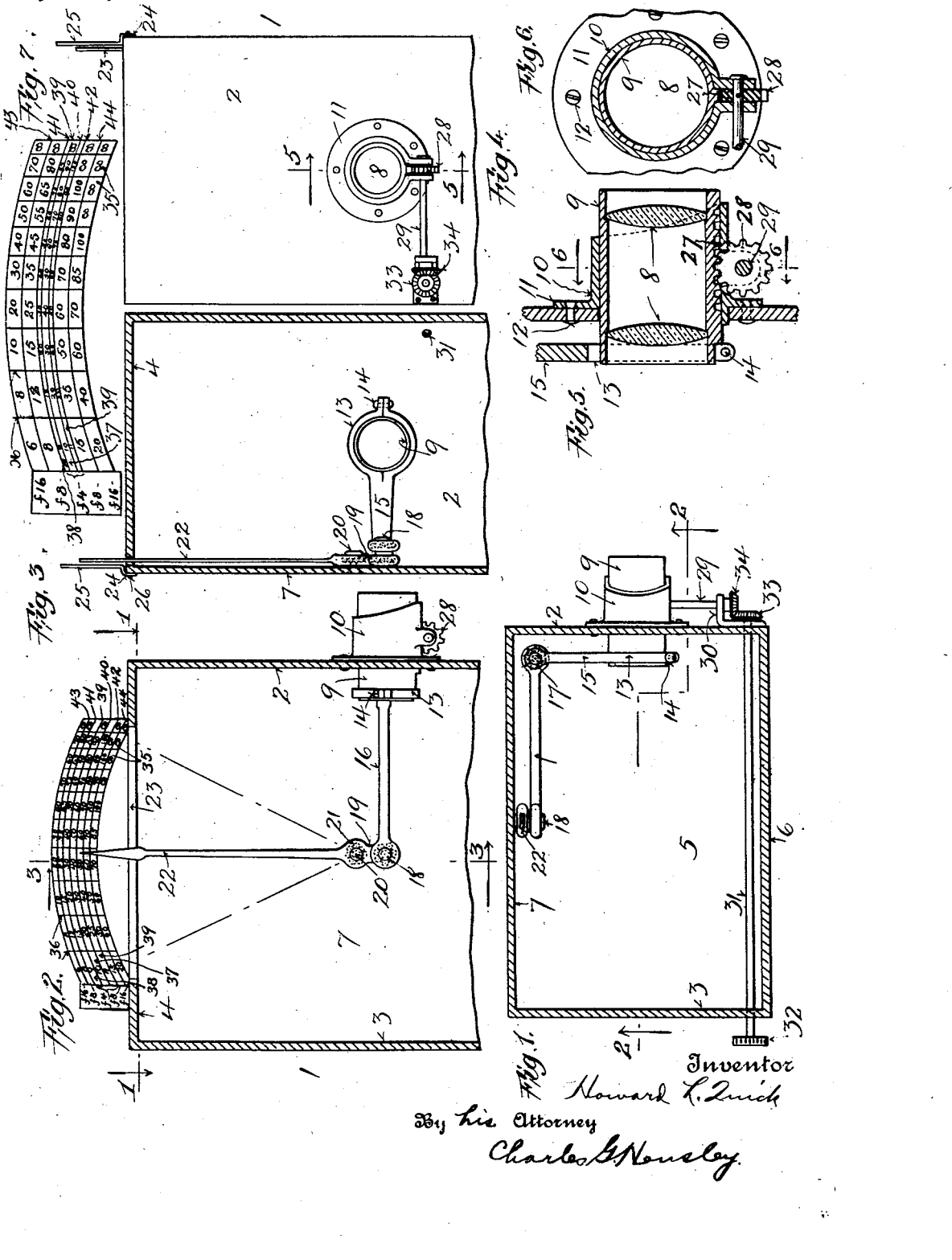

HOWARD L. QUICK, OF BROOKLYN, NEW YORK.

FOCUSING DEVICE FOR MOTION-PICTURE CAMERAS.

1,300,773.   Specification of Letters Patent.   Patented Apr. 15, 1919.

Application filed January 29, 1916.   Serial No. 74,989.

*To all whom it may concern:*

Be it known that I, HOWARD L. QUICK, a citizen of the United States, and a resident of the borough of Brooklyn, city of New York, county of Kings, and State of New York, have invented a certain new and useful Focusing Device for Motion-Picture Cameras, of which the following is a specification.

My present invention relates to a focusing device for cameras which are used for taking motion pictures or pictures of objects in motion. The object of the invention is to provide a simple and convenient device for altering the focal distance of the lens from the sensitized medium such as the film, so that the lens may always be focused on the principal object of the scene when desired, or so that certain objects may be thrown slightly out of focus for producing different desired effects. Another object of the invention is to provide means for showing, preferably on an enlarged scale, the focal position of the lens at all times, so that the operator may know whether the lens is at the desired position from time to time.

Another object of my invention is to provide a device which will indicate the focal position of the lens in connection with a scale which will indicate to the operator the range within which he should operate the focusing device to produce the best results.

In taking pictures of objects in motion it has heretofore been the practice to set the lens in a fixed position and to take all the exposures under that condition regardless of the fact that the principal object may be moving toward or from the camera while the succesive pictures are being taken or that the camera may be moving toward or from the object. This resulted in the principal object being in focus at times and out of focus at other times. It has been customary to partially overcome the defects by stopping down the lens with the diaphragm but this results in other disadvantages.

When the principal objects are even slightly out of focus the defect is so multiplied in the subsequent projection of the pictures that the objects have an indistinct or blurred appearance which is more disagreeable as the observer approaches closer to the projecting screen.

With the present invention the lens may be used at full opening, or stopped down to any degree and the desired objects may always be kept in focus. The lens operates to accomplish the same result as the human eye but in a different manner. The lens may be caused to accommodate itself to the changing focal distance by being moved toward or from the film. This not only improves the sharpness of the pictures but the effect is more nearly like that produced on the brain when the human eye follows a moving object.

In the drawings forming part of this application,

Figure 1 is horizontal sectional view of a motion picture camera box, with the film and its feeding device, which are well known, omitted for simplicity, and the view is taken on the line 1—1 of Fig. 2, Fig. 2 is a vertical sectional view, taken on the line 2—2 of Fig. 1, Fig. 3 is a sectional view, taken on the line 3—3 of Fig. 2, Fig. 4 is a front elevation of the camera, Fig. 5 is a sectional view, taken on the line 5—5 of Fig. 4, Fig. 6 is a sectional view taken on the line 6—6 of Fig. 5, and Fig. 7 is a face view of the dial.

The camera box 1 may be of any desired shape and construction. I have shown a simple box consisting of a front 2, a back 3, a top 4, a bottom 5 and side walls 6, 7. It is to be understood that the box will contain a device for feeding or advancing a film step by step and that suitable reels will be provided for letting off and taking up the film, but as such devices are well known I have not shown them herein.

The lens may be mounted in various ways but for simplicity I have shown the lens 8 mounted in a lens casing or shell 9 which is slidable in and out in a tubular support 10 having a flange 11 attached to the camera box by the screws 12. There is shown a strap 13 which surrounds the lens casing and it is tightly clamped thereon by the screw 14 so that when the lens is moved in or out the strap will be likewise moved. The strap 13 is on one end of an arm 15, which projects crosswise of the box 1 and the opposite end of the arm is near the side 7 of the box. This latter end of the arm 15 has a rocking connection with a link 16, preferably by means of a ball bearing connection 17 which will eliminate all looseness in the connection between the arm and the link. The other end of the link 16 is similarly connected by a ball-bearing connection, 18, with the shorter arm 19 of a lever which is fulcrumed on a stud 20 secured to the side 7 of the box. The connection 21 is preferably ball-bearing, to avoid lost motion between the parts, so that any movement of the lens casing will be accurately transmitted through the parts described. The free arm 22 of this lever projects through a slot 23 in the top 4 of the camera box and its upper extremity is adapted to serve as a pointer. If desired, the upper end may be shaped like an arrow point to indicate the purpose thereof.

I have arranged the scale in position to coöperate with this pointer and it is here shown as a strip 24 attached to the camera box by screws 26 and extending upwardly therefrom is the scale proper, 25, which is shown as segmental in shape.

The lens casing has rack teeth 27 at the bottom, with which the pinion 28 meshes. The latter is fixed on a shaft 29 which is suitably journaled in brackets 30, the shaft extending across the front of the camera box to a position near the side 6. There is a shaft 31 which extends through the front and rear walls 2, 3 of the box and it is provided with an operating handle or knob 32 by means of which this shaft, 31, may be operated from behind the camera. The shaft 31 has a miter gear 33 on its forward end which meshes with a similar gear 34 on the shaft 29, whereby the movement of the shaft 31 is transmitted to the shaft 29 and the turning of the latter operates through the pinion 28 and rack 27 to move the lens in or out. By means of the parts just described it is possible to rack the lens in or out while the pictures are being taken. While these parts are simple and convenient for moving the lens, nevertheless any other device may be employed for changing the focus of the lens.

It is preferable to arrange the focusing device proper separate from the indicating device, as above described, although I do not wish to be understood as limiting my invention to this particular arrangement.

In taking pictures of objects in motion with the present invention, the operator should either be able to judge distances, or else he should first lay out, mentally or on a chart or by markings in the scene, various distances, so that he will be able to judge the distance of the principal object in the scene from the camera at various times as that object moves closer to or farther from the camera, in order to be able to operate the knob 32 so as to change the focus of the lens accordingly. After a short time the operator will become very proficient in judging distances and he will be able to vary the focus of the lens while taking the pictures so that the principal object will be kept in accurate focus as its position in relation to the camera changes, even though the lens is used at its full opening. In most instances it will be unnecessary to change the diaphragm opening, so that the light entering the lens will remain uniform. So far as this branch of my invention is concerned it consists, broadly, of means for varying the focus of the lens to agree with the changing position of a moving object.

Whenever the lens is moved by the focusing device the movement will be accurately indicated by the pointer 22 in relation to the scale 25 by reason of the fact that the movement of the lens is transmitted through the arm 15 and link 16 to the lever 19, 22, the upper end of which latter forms the pointer. It will be noted that the lever arm 19 is much shorter than the arm 22 so that the movement of the lens is magnified by the pointer, and I prefer to arrange these parts so that the movement of the pointer will be about ten times greater than that of the lens. This renders it very easy for the operator to read the lens movements on the scale and it makes it possible to use a scale having a considerable number of indications and large enough to be quickly read.

I have devised a scale which will materially assist the operator in keeping the lens in proper focus on the principal object so that the device will not only serve to indicate the position of the lens but it will also serve to indicate the maximum and minimum distances at which objects will be in fairly accurate focus with any given lens position. The device will indicate the approximate latitude within which the operator may work the focusing device and secure a sharp image of the principal object of the scene. The numerals on the scale are not given as a mathematically and optically accurate example, but only to indicate the device with sufficient detail to enable the device to be applied to practice by those skilled in the art. The scale may be worked out on known optical formulæ.

On this scale I have arranged a number of curved lines, dividing the scale lengthwise, and a number of lines dividing it vertically; so that the scale is divided into a number of spaces 35. The vertical divisions correspond with different diaphragm or "$f$" values, whereas the longitudinal divisions correspond with different focal positions of the lens. Starting from the left the vertical divisions become gradually closer, the ones at the extreme right, corresponding with the infinity position of the lens, being quite close.

If the lens is so positioned as to bring the pointer to the extreme left of the scale and the diaphragm (not shown) is arranged to work at $f^4$, then so long as the pointer remains in the first vertical division, i. e. between the first and second vertical lines 36, objects distanced ten feet from the camera will be in perfect focus, the distance being indicated by the numeral 10 in the middle space 37. The numeral in the space 38 just above (indicated by numeral 9 in the drawing) will indicate the minimum distance at which objects will be in fairly sharp focus with the diaphragm opening at $f^4$ and the pointer in the first vertical division of the scale; and the numeral in the space 39 just below (given as 11) will indicate the maximum distance at which objects will be in fairly sharp focus under the condition stated. The operator will know that if the principal object of the scene is 10 feet from the camera it will be in sharp focus but if his judgment of the distance of the object should err between 9 and 11 feet the object will still be in fairly sharp focus.

Should the object move away from the camera the operator, by turning the knob 32 will rack in the lens, and the pointer 22 will advance toward the right hand end of the scale, say, to a position between the second and third vertical lines 36. If the lens is still working with a diaphragm aperture equal to $f^4$ the operator will continue to read the scale markings between lines 39, 40—39, 41 and 40, 42; and this is true all along the scale until the diaphragm opening is changed. In the second position just assumed, the markings on the scale will indicate that the principal object, if at 20 feet from the camera, will be in perfect focus, but if the operator's judgment errs between 15 feet and 25 feet the object will still be in fairly sharp focus.

As the object moves farther and farther away, so the lens will be racked inwardly and the pointer will move across the whole scale, passing from one vertical division to another. As it does this, the scale will indicate say, 30 feet, 40 feet, 50 feet, 60 feet, 70 feet, 80 feet, 90 feet and then infinity, as the distances at which the object will be in perfect focus. While these changes are taking place the operator will read the figures just above and just below those stated, for the respective minimum and maximum distances at which the object will be in fairly sharp focus. As the distance becomes greater so the operator may err in judging the distance to a greater extent and still obtain good results, because as the lens approaches the infinity position the depth of focus increases.

If the lens is operated with a diaphragm opening equal to, say, $f^8$, then the operator will continue to read the numerals between the lines 39 and 40 for perfect foci but he will read the numerals between the lines 41 and 43 for the minimum and between the lines 42 and 44 for the maximum distances between which the object will be reasonably sharp. In other words, the numerals between the lines 39 and 40 will serve the same purpose when working with the diaphragm at $f^8$ as the numerals between these lines when working with the diaphragm at $f^4$. The smaller the diaphragm opening the wider is the range between the maximum and minimum figures. The present device, however, makes it possible to use a larger diaphragm opening and to obtain sharp focus on the principal object. In view of this, better results, photographically, may be obtained and the greatest advantage may be taken of the light, especially where the light is not sufficient to permit the stopping down of the lens. It is also possible to work with the diaphragm opening the same during an entire play, and, therefore, the light, acting on the sensitized film, will not be increased and decreased, causing variations in the light effect when the pictures are afterward projected on a screen.

If, instead of working with the diaphragm at $f^4$, or $f^8$, it is stopped down to $f^{16}$, then the operator will read from the middle row of figures, as before, for perfect foci and from the top and bottom rows for minimum and maximum distances within which fairly sharp results may be obtained.

It is obvious that the scale may be extended to cover all $f$ values at which the lens is adapted to be operated, the principle being the same throughout.

As the pointer moves much farther than the lens it indicates the latter movement on a much larger scale and this makes it very easy for the operator to follow the markings on the scale.

If desired, distances may be marked off in the scene to correspond with the markings of the scale so that the operator will be sure of the distance of the principal object from the camera at different times, but this will not generally be necessary as the operator will very readily learn to judge the distances without any markings in connection with the scene.

As above stated, I prefer to separate the means for focusing the lens and the means for indicating the focus, but this is not absolutely necessary to the employment of my invention.

I do not wish to be understood as limiting my invention to the particular embodiment herein shown and described, but to include all forms which come within the spirit or scope of the annexed claims.

Having described my invention, what I claim is:—

1. In a device of the class described, the combination of a camera for taking pictures including a lens, of means for moving the lens to focus the same, means movable automatically with the lens for indicating the positions thereof on an enlarged scale and a dial associated with said indicating means and having markings thereon representing different distances at which objects will be in focus.

2. In a device of the class described the combination of a camera for taking pictures including a lens, means for focusing the lens during the taking of the pictures, automatically moved means for indicating the different focal positions of the lens and a dial coöperating with said indicating means and having markings representing different distances at which objects will be in sharp focus and having markings indicating maximum and minimum distances at which objects will be in approximate focus.

3. In a device of the class described the combination of a camera for taking pictures including a lens, means for focusing the lens during the taking of the pictures, automatically moved means for indicating the different focal positions of the lens and a dial coöperating with said indicating means and having markings representing different distances at which objects will be in sharp focus, and having markings indicating maximum and minimum distances at which objects will be in approximate focus when the lens is operated with a given diaphragm opening and having other markings indicating maximum and minimum distances at which objects will be in approximate focus when the lens is operated with a different diaphragm opening.

4. In a device of the class described the combination of a camera for taking pictures including a movable lens, means movable automatically for indicating the different focal positions of the lens, and a dial coöperating with said indicating means and having a row of markings indicating different distances at which objects will be in sharp focus at different lens positions, and having rows of markings arranged above and below and in line with said first markings for indicating minimum and maximum distances at which objects will be in approximate focus, and markings indicating different diaphragm values associated with said latter rows of markings.

Signed at the city, county and State of New York this 27th day of January, 1916.

HOWARD L. QUICK.